TRANSISTOR CONVERTER CIRCUIT
Filed Dec. 9, 1959
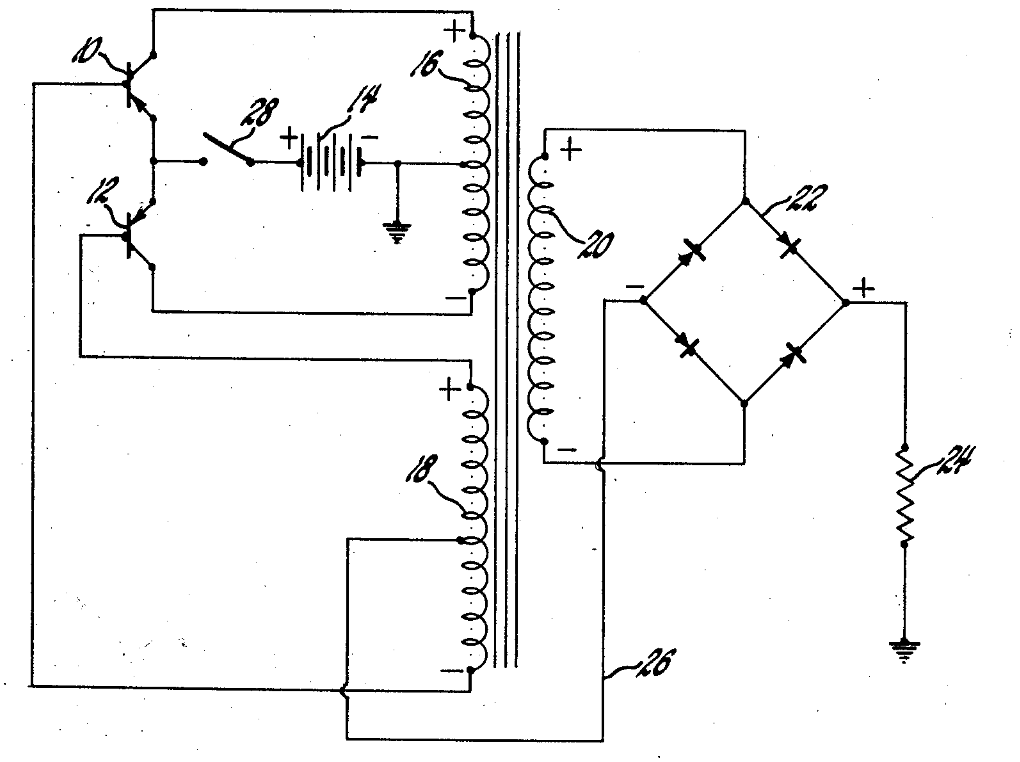
INVENTORS
Joseph E. Murphy &
Francis J. Starzec
BY Paul J. Ethington
ATTORNEY 3,171,077

TRANSISTOR CONVERTER CIRCUIT

Joseph E. Murphy, Cudahy, Wis., and Francis J. Starzec, Fullerton, Calif., assignors to General Motors Corporation, Detroit, Mich., a corporation of Delaware Filed Dec. 9, 1959, Ser. No. 858,368
4 Claims. (Cl. 321—2)

This invention relates to power supply circuits and more particularly to a converter circuit utilizing a transistor oscillator and rectifier circuit for converting a low direct current potential to a higher direct current potential.

In accordance with this invention, there is provided a push-pull transistor oscillator circuit which is capable of starting oscillations with loads, such as electron tube filaments, which require high surge starting currents. Additionally, the oscillator is capable of supplying power at high efficiency to variable loads, such as the transmitter and receiver tube circuits of a radiotelephone. This is accomplished by a transistor oscillator circuit in which the load current is fed back to the input circuit of the conductive transistor and a feedback voltage is applied to the other transistor to maintain it non-conductive.

In the inventive circuit arrangement, the transistors are connected in push-pull fashion with a coupling transformer. The transistor output circuits are connected through opposite halves of a primary winding and the input circuits are connected through opposite halves of a feedback winding; a secondary winding transforms the alternating voltage of the primary winding to the desired voltage level and is coupled through a rectifier to the load. Feedback current corresponding to the load is provided by connecting transistor input circuits in series with the load across the output terminals of the rectifier circuit.

In this arrangement, the starting bias current for the transistor oscillator is determined by the magnitude of the load and the power which would be dissipated in the bias resistors of conventional oscillators is instead, supplied to the load. The feedback current, after oscillations commence, also corresponds to the magnitude of the load and thus provides driving power commensurate with the value of the load so that the losses arising from excessive driving current are avoided. The alternating voltage induced in the feedback winding is rectified by the input circuits of the transistors and this voltage is added directly to the rectified secondary voltage and to the supply voltage in series with the load. Consequently, for a desired output voltage, the number of turns required on the secondary winding can be reduced with the advantage of smaller transformer size and higher efficiency due to the lower copper loss in the transformer.

A more complete understanding of this invention may be had from the detailed description which follows taken with the accompanying drawing in which, the single FIGURE is a schematic diagram of the inventive converter circuit.

Referring now to the drawings, there is shown an illustrative embodiment of the invention in a converter circuit adapted to develop a high direct current potential from a low direct current potential. In general, the converter circuit comprises a pair of transistors 10 and 12 connected in push-pull with a transformer primary winding 16 through a direct voltage source or battery 14. The transistor input circuits are connected through a feedback winding 18 which provides switching voltages for the transistors. A transformer secondary winding develops an alternating voltage of a desired level which is applied through a bridge rectifier circuit 22 to the load 24. Load current feedback is provided through the conductor 26 to the input circuit of the transistors.

Considering the converter circuit in more detail, the transistors 10 and 12 are suitably of the P-N-P junction type and are connected in a common emitter configuration. The emitter electrodes are connected together and are connected through a starting switch 28 to the positive terminal of the battery 14. The negative terminal of the battery is connected to ground and to the center tap of the primary winding 16. The collector electrode of the transistor 10 is connected to the upper terminal of the primary winding 16 and the collector electrode of the transistor 12 is connected to the lower terminal of the primary winding 16. The base electrodes of the transistors 10 and 12 are connected to opposite end terminals of the feedback winding 18. The secondary winding 20 has its end terminals connected across the input terminals of the rectifier circuit 22 which takes the form of a full-wave bridge rectifier suitably employing rectifiers of the semiconductor type. The positive output terminal of the rectifier circuit 22 is connected through the load 24 to ground and the negative output terminal is connected through the conductor 26 to a center tap on the feedback winding 18. The transformer core is desirably of the type having a substantially rectangular hysteresis loop but may be suitably constructed of a ferrite material. The load 24 may be variable, such as the electron tube plate supply circuits of a radiotelephone in which the receiver and transmitter are alternately energized. Such a load may draw a high surge starting current due to filter capacitors in the load circuits. The phase relationship of the transformer windings is indicated by the polarity symbols in the drawing.

In operation of the converter circuit, the starting switch 28 is closed and the battery 14 causes starting bias current to flow through the transistor input circuit from emitter to base in both transistors 10 and 12 and through the feedback winding 18 and conductor 26 and thence through the rectifier circuit 22 and the load 24 to ground. Thus, the value of the starting bias current for the transistors is determined by the magnitude of the load 24. A low resistance or heavy load results in a large bias current and consequently, the starting of oscillations is assured. This starting bias current will cause the output circuits of the transistors 10 and 12 to become conductive and due to the inevitable slight difference between the transistors or their associated circuits, one transistor will become somewhat more conductive than the other. Assuming that the conduction of transistor 10 predominates, the transistor output circuit from emitter-to-collector will become increasingly conductive through the upper half of the primary winding 16. By virtue of the inductive coupling with the feedback winding 18, a feedback voltage will be developed with the polarity indicated which causes the base of transistor 10 to become more negative so that transistor 10 becomes more conductive. At the same time, the positive voltage applied to the base of transistor 12 will cause that transistor to become non-conductive. Simultaneously, a voltage with the polarity indicated is developed across the secondary winding and applied across the input terminals of the rectifier circuit 22 which develops a voltage across its output terminals with the polarity indicated. As the current through the primary winding 16 increases further, the flux increases until the transformer core is saturated and the voltage induced in the feedback winding and the secondary winding decreases to zero. Consequently, the field of the transformer collapses and the voltage induced in the feedback winding 18 is reversed in polarity causing the transistor 10 to become non-conductive and the transistor 12 to become conductive. As the current in the output circuit of transistor 12, through the emitter and collector electrode increases, a voltage is induced by the primary winding in the feedback winding with a polarity opposite the indicated polarity so that transistor 10 is further cut off and transistor 12 becomes fully conductive. At the same time, a voltage is induced in the secondary winding 20 with a polarity opposite that shown and is applied to the full wave rectifier circuit 22 which develops a voltage across its output terminals as indicated. When the transformer reaches saturation, the transistors are switched again and the cycle described is repeated at a frequency which is dependent largely upon the voltage of the battery 14 and the parameters of the transformer. Consequently, an alternating square wave voltage is developed across the secondary 20 with an amplitude determined by the transformer turns ratio and is rectified by the bridge rectifier 22 to develop a steady direct voltage with the polarity indicated.

The voltage applied across the load 24 is the sum of the rectified secondary winding voltage, the rectified feedback winding voltage, and the battery voltage. This voltage summation is achieved by the connection of the load, the feedback winding halves and the battery in series across the output terminals of the rectifier circuit. When the transistor 10 is conductive, this series circuit extends through its emitter to base electrodes and when the transistor 12 is conductive, this series circuit extends through its emitter to base electrodes. Thus, the load current serves as the feedback current to the transistors 10 and 12 and at the same time, the feedback voltage developed by the winding 18 is employed to maintain the non-conductive transistor fully cut off. This feedback voltage is rectified by the transistor input circuits and is added to the secondary voltage across the load.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

We claim:

1. A converter circuit comprising a pair of transistors each having input, output and common electrodes, a transformer having primary and feedback windings with respective center taps and having a secondary winding, said primary winding being connected between the output electrodes of the transistors, a voltage source connected between the center tap of the primary winding and the common electrodes of the transistors, said feedback winding being connected between the input electrodes of the transistors, a full wave rectifier circuit having its input terminals connected across the secondary winding, one output terminal of the rectifier circuit being connected through a load and said voltage source to the common electrodes and the other output terminal of the rectifier circuit being connected to the center tap of the feedback winding.

2. A converter circuit comprising a pair of transistors each having emitter, base and collector electrodes, a transformer having primary and feedback windings with respective center taps and having a secondary winding, said primary winding being connected between said collector electrodes, a voltage source connected between the center tap of the primary winding and said emitter electrodes, said feedback winding being connected between the base electrodes, a full wave rectifier circuit having its input terminals connected across the secondary winding, one output terminal of the rectifier circuit being connected through a load to the center tap of the primary winding and the other output terminal of the rectifier circuit being connected to the center tap of the feedback winding.

3. A converter circuit comprising a pair of transistors each having input, output and common electrodes, a transformer having primary and feedback windings with respective center taps and having a secondary winding, an output circuit for said transistors including said primary winding connected between said output electrodes, a voltage source connected between the center tap of the primary winding and said common electrodes, a feedback circuit for said transistors including said feedback winding connected between the input electrodes to cause the transistors to be alternately conductive and non-conductive, a full wave rectifier circuit having its input terminals connected across the secondary winding, one output terminal of the rectifier circuit being connected through a load to the center tap of the primary winding and the other output terminal of the rectifier circuit being connected to the center tap of the feedback winding whereby the load voltage is the summation of the rectified secondary winding voltage, the rectified feedback winding voltage, and the source voltage, and whereby the load current flows through the input circuit of the conductive transistor.

4. A converter circuit comprising a low direct voltage source and a load adapted for energization by a higher direct voltage, first and second transistors each having emitter, base and collector electrodes, a transformer including primary and feedback windings with respective center taps and including a secondary winding, the output circuit of each transistor extending through its collector and emitter electrodes and through the respective half of the primary winding and the voltage source, a full wave rectifier circuit having its input terminals connected across said secondary winding, the input circuit of each transistor extending through its emitter and base electrodes and being connected in series with the respective half of the feedback winding, the voltage source, and the load between the output terminals of said rectifier circuit whereby the voltage source causes a starting bias current corresponding to the magnitude of the load to flow in the input circuits to start conduction in said output circuits, said transformer having a core of magnetic material with a substantially rectangular hysteresis loop and being proportioned for magnetic saturation by the magnetizing current in the primary winding whereby a feedback voltage is induced in the feedback winding for switching the transistors alternately conductive and non-conductive, the direct voltage across the load being the sum of the rectified secondary winding voltage, the rectified feedback winding voltage, and the voltage of the source.

References Cited in the file of this patent

UNITED STATES PATENTS

| | | |
|---|---|---|
| 2,941,158 | Pintell | June 14, 1960 |
| 2,950,446 | Humez et al. | Aug. 23, 1960 |
| 3,012,181 | Schultz | Dec. 5, 1961 |